UNITED STATES PATENT OFFICE.

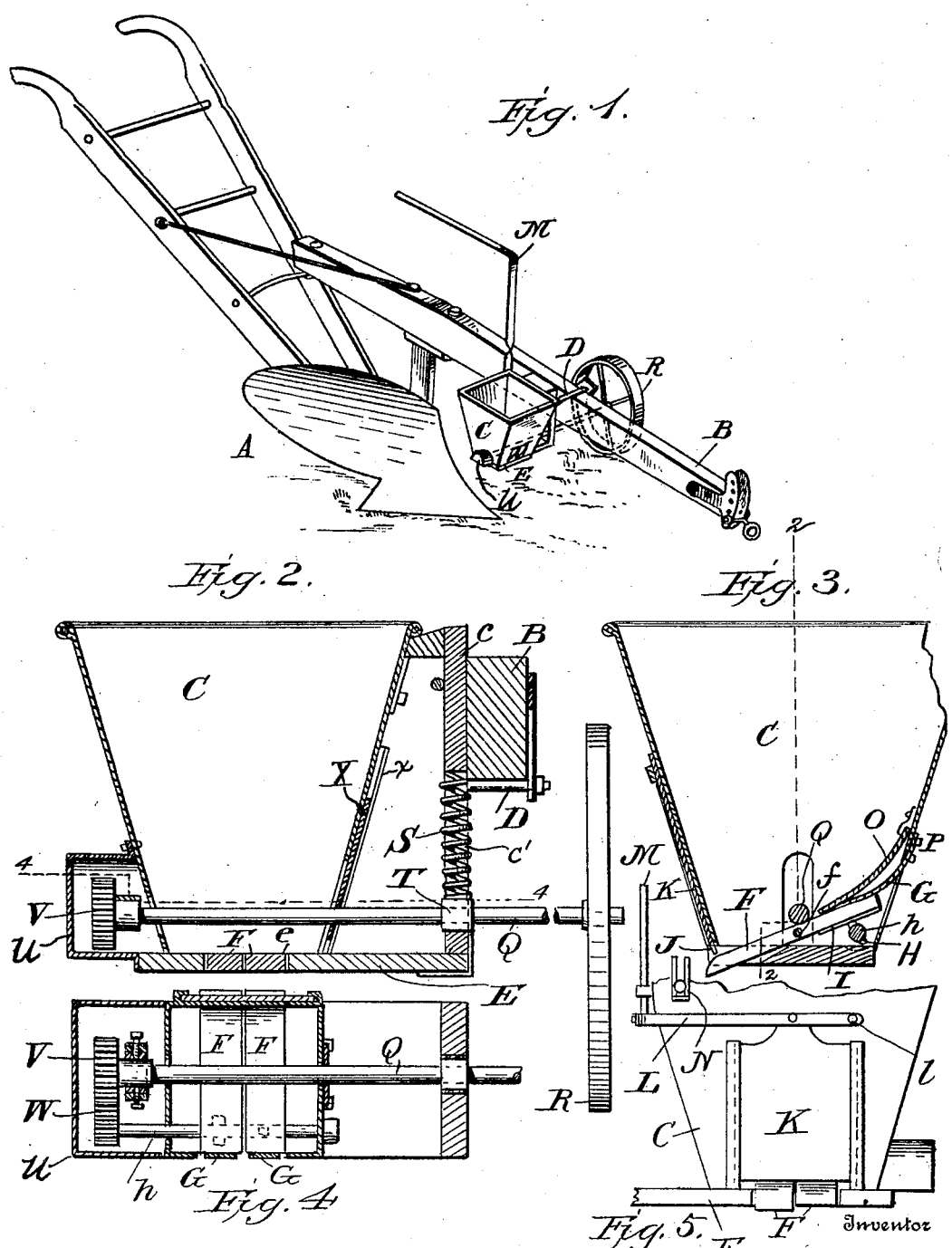

LARRY GRIFFIN, OF WILSON, NORTH CAROLINA.

FERTILIZER-DISTRIBUTER.

No. 832,254. Specification of Letters Patent. Patented Oct. 2, 1906.

Application filed December 27, 1905. Serial No. 293,472.

*To all whom it may concern:*

Be it known that I, LARRY GRIFFIN, a citizen of the United States of America, residing at Wilson, in the county of Wilson and State of North Carolina, have invented certain new and useful Improvements in Fertilizer-Distributers, of which the following is a specification.

This invention relates to planters and seeders, and particularly to a fertilizer-distributer designed for use in connection with plows, whereby the fertilizer may be distributed in front of the plow in order that the soil may be turned over to cover the fertilizer.

An object of this invention is to provide novel means for affording a yielding action of the ground or power wheel, whereby the agitator and feeding mechanism is driven, means being also provided for causing the power-shaft to aid in agitating the contents of the hopper to prevent caking or packing of the said contents.

Finally, an object of this invention is to provide a fertilizer-distributer of the character noted possessing advantages in points of simplicity, efficiency, and durability, proving at the same time comparatively inexpensive to produce and maintain.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view in perspective of a plow with the fertilizer-distributer attached thereto. Fig. 2 is a transverse vertical sectional view of the fertilizer-distributer on the line 2 2 of Fig. 3. Fig. 3 illustrates a sectional fragment of the hopper and the internal mechanism thereof. Fig. 4 is a sectional view taken on a line corresponding to the line 4 4 of Fig. 2, and Fig. 5 is a view in elevation of a fragment of the hopper with the feeding-gate mechanism in detail.

In the drawings, A denotes a plow which may be of any ordinary construction, having a beam B, to which the fertilizer-distributer is attached.

It is the purpose of this invention, as stated, to distribute the fertilizer in front of the plow in such a way as to cause the shovel or blade of the plow to turn the soil over the fertilizer distributed.

The hopper C has a bracket $c$ at the side, which is clamped to the beam B of the plow through the medium of the clamp D. By this means the distributer may be adjusted vertically with relation to the beam in order that the depth of cut may vary according to the condition of the ground to be worked.

The bottom E of the hopper has an aperture $e$, which is closed by two pivoted agitators F, mounted on the pivot $f$. The rear ends of the agitators have springs G bearing on them in order that they may be normally depressed against the lugs H of the shaft $h$. The agitators are further provided with wear-plates I, against which the lugs bear as they are rotated against the surface of the said wear-plates. The opening is normally closed by the sliding gate K, which gate is manipulated through the medium of the lever L, having connection with the arm M. One end of the lever is pivoted at $l$, and intermediate its length the said lever is pivoted to the gate. The movement of the arm M determines the position of the gate, although the movement of the said arm may be limited by means of the stop N, which is adjustable on the hopper and is adapted to be abutted by the said lever L. The discharge-opening in the hopper may be entirely closed by causing the end of the gate to lie against the ends of the agitators, in which position the heel ends of the said agitators are raised entirely clear of the lugs on the shaft $h$, and therefore no agitation of the contents of the hopper takes place when the parts are in this relation.

The interior of the hopper is provided with an apron O, which has its ends fastened in any suitable manner to the inner wall of the hopper, and said apron extends down over the upper surfaces of the agitators in order to prevent any discharge of the contents of the hopper back of the heel ends of the agitators. The springs G extend outward and overlap a portion of the outer wall of the hopper, and they are secured thereto through the medium of the bolts P or other means.

The power shaft or axle Q has a ground-wheel R, which is pressed into firm contact with the ground by a spring S, the said spring bearing on the journal-box T, in which the shaft Q is mounted. The shaft Q passes through an elongated opening $c'$ in the bracket $c$, the opposite end of the spring S bearing against the upper edge of the opening $c'$. The shaft is thus yieldingly mounted in place in order that the wheel may move over uneven surfaces of the ground without interfering with the operation of the device. Owing to the oscillation or yielding movement of the shaft Q when thus mounted, the contents of the hopper C will be more or less agitated, owing to the fact that the said shaft Q extends transversely through the said hopper.

To one side of the hopper is a gear-casing U, which contains the gear-wheels V and W, the former of which is mounted on the power-shaft and the other on the shaft $h$, which is utilized, as heretofore stated, for the purpose of oscillating the agitators. The power-shaft extends through openings in the sides of the hopper, and the opening adjacent the bracket is elongated to permit yielding movement or oscillation of the shaft Q. In order to prevent escape of the contents of the hopper through the elongated opening, I provide a guard X, which is slidable in guides $x$, attached to the hopper, so that the said guard completely closes the opening in the side of the hopper through which the shaft extends. As the guard is permitted to slide up and down with the movement of the shaft, and as the guard covers the elongated opening in which the shaft moves, it follows that the contents of the hopper may not escape.

The frame of the hopper—viz., the bracket $c$ and bottom E—is secured together in any suitable manner to produce a frame-like structure; but as this particular feature is not a material part of the invention it will not be described in detail.

Having fully described my invention, what I claim as new, and desire to secure by Letters Patent, is—

1. In a fertilizer-distributer, a suitable hopper, agitators forming a portion of the bottom thereof, the said hopper having a discharge-opening, a gate for controlling the discharge-opening, means for manipulating the gate, a power-shaft extending through the hopper, means for permitting the oscillation of the power-shaft within the hopper, a ground-wheel on the power-shaft, suitable means whereby movement from the power-shaft is communicated to the agitators and means for attaching the hopper to a plow-beam.

2. In a fertilizer-distributer, a suitable hopper having a discharge-opening, a gate for controlling the discharge-opening, agitators forming a portion of the bottom of the hopper and operating to feed the contents of the hopper through the discharge-opening, an apron within the hopper extending over a portion of the agitators to prevent accidental waste of the contents of the hopper, means for securing the hopper to a plow-beam, a power-shaft mounted in the hopper to oscillate therein, a yielding bearing in which the shaft is journaled, a slide taking motion from the shaft and adapted to guard the shaft-opening in the hopper, a ground-wheel on the shaft, and suitable connection from the power-shaft whereby the agitators are moved.

3. In a fertilizer-distributer, a suitable hopper having a discharge-opening in one side and apertures for the reception of a shaft, a power-shaft in said apertures, a slide on the shaft adapted to close an opening in the hopper, the said slide taking motion from the power-shaft, a ground-wheel on the power-shaft, agitators forming a portion of the bottom of the hopper, springs for normally depressing the agitators, means for elevating the agitators against the action of the springs, and connection between the power-shaft and the said means.

4. In a fertilizer-distributer, a bracket having an elongated opening, a hopper carried by the bracket, a shaft carried by the bracket and passing through the elongated opening thereof, and spring means within the opening engaging with the shaft, and a ground-wheel mounted on the shaft.

5. In a fertilizer-distributer, a bracket having an elongated opening, a hopper carried by the bracket, a shaft carried by the bracket and passing through the elongated opening thereof, and a spring within the opening of the bracket, said spring having one end bearing against the shaft and the opposite end against the upper edge of the opening.

6. In a fertilizer-distributer, a suitable hopper, agitators forming a portion of the bottom of the hopper, the said hopper having a discharge-opening, a power-shaft extending through the hopper, and having a yielding movement, a ground-wheel on the power-shaft, and suitable means whereby the rotation of the power-shaft operates the agitators.

7. In a fertilizer-distributer, a hopper having a discharge-opening, agitators extending within the discharge-opening, a shaft extending through the hopper above the agitators, means carried by the shaft for rotating the same, a shaft mounted in the hopper beneath the agitators, means whereby the rotation of the first-named shaft will rotate the last-named shaft to operate the agitators.

8. In a fertilizer-distributer, a hopper having a discharge-opening, agitators extending within the discharge-opening, a shaft extending through the hopper above the agitators, means carried by the shaft for rotating the same, a shaft mounted in the hopper beneath the agitators, means whereby the rotation of the first-named shaft will rotate the last-named shaft, and means carried by the last-named shaft engaging with the under surface of the agitators to operate said agitators.

9. In a fertilizer-distributer, a hopper having a discharge-opening, agitators extending within the discharge-opening, a shaft extending through the hopper above the agitators, means carried by the shaft for rotating the same, a shaft mounted in the hopper beneath the agitators, means whereby the rotation of the first-named shaft will rotate the last-named shaft, means carried by the last-named shaft engaging with the under surface of the agitators to operate said agitators, and wear-plates carried by the under surface of the agitators.

10. In a fertilizer-distributer, a hopper having a discharge-opening, agitators extending within the discharge-opening, a shaft extending through the hopper above the agitators, means carried by the shaft for rotating the same, a shaft mounted in the hopper beneath the agitators, means whereby the rotation of the first-named shaft will rotate the last-named shaft, and lugs carried by the last-named shaft to engage with the under surface of the agitators to operate the same.

In testimony whereof I affix my signature, in the presence of two witnesses, this 21st day of December, 1905.

LARRY GRIFFIN.

Witnesses:
W. A. FINCH,
C. C. PIERCE.